(12) United States Patent
Nagai et al.

(10) Patent No.: US 9,632,303 B2
(45) Date of Patent: Apr. 25, 2017

(54) OPTICAL MICROSCOPE, AND AUTOFOCUS DEVICE FOR OPTICAL MICROSCOPE

(71) Applicant: OSAKA UNIVERSITY, Suita-shi, Osaka (JP)

(72) Inventors: Takeharu Nagai, Suita (JP); Yoshiyuki Arai, Suita (JP)

(73) Assignee: Osaka University, Osaka (JP)

(*) Notice: Subject to any disclaimer, the term of this patent is extended or adjusted under 35 U.S.C. 154(b) by 0 days.

(21) Appl. No.: 14/647,401

(22) PCT Filed: Nov. 20, 2013

(86) PCT No.: PCT/JP2013/081259
§ 371 (c)(1),
(2) Date: May 26, 2015

(87) PCT Pub. No.: WO2014/080932
PCT Pub. Date: May 30, 2014

(65) Prior Publication Data
US 2015/0309298 A1    Oct. 29, 2015

(30) Foreign Application Priority Data

Nov. 26, 2012 (JP) ................................ 2012-257426

(51) Int. Cl.
*G02B 21/36* (2006.01)
*G02B 7/28* (2006.01)
(Continued)

(52) U.S. Cl.
CPC ............. *G02B 21/365* (2013.01); *G02B 7/28* (2013.01); *G02B 21/0004* (2013.01);
(Continued)

(58) Field of Classification Search
CPC .... G02B 21/361; G02B 21/18; G02B 21/365; G02B 7/28; G02B 21/02; G02B 21/367;
(Continued)

(56) References Cited

U.S. PATENT DOCUMENTS

| 2005/0068614 | A1 | 3/2005 | Yoneyama et al. |
| 2007/0085025 | A1* | 4/2007 | Eggeling ............ G01N 21/6408 250/459.1 |
| 2010/0103254 | A1* | 4/2010 | Okamoto ............ G02B 21/0088 348/79 |

FOREIGN PATENT DOCUMENTS

| JP | 2007-148161 | 6/2007 |
| JP | 2010-218232 | 9/2010 |

(Continued)

OTHER PUBLICATIONS

Chang et al.: "Optogenetic activation during detector "dead time" enables compatible real-time fluorescence imaging"; Neuroscience Research 73 (2012), pp. 341-347.

(Continued)

*Primary Examiner* — Mohammed Hasan
*Assistant Examiner* — Rahman Abdur
(74) *Attorney, Agent, or Firm* — Hamre, Schumann, Mueller & Larson, P.C.

(57) ABSTRACT

Provided is an optical microscope capable of maintaining an objective lens in a focus state without adversely affecting a captured image even when a substance with a weak emission is used as an observation target object. The optical microscope includes an observation optical system capable of capturing, with an image pickup device (10), an optical image of an observation target object (1) that has been obtained with an objective lens (5), and sending out the optical image as an image signal; and an autofocus device that adjusts a focal position of the objective lens based on autofocus light emitted from a focusing light source (11) so (Continued)

as to focus on the observation target object, wherein the autofocus light is emitted from the focusing light source during a non-capturing period during which the image pickup device is not capturing an image of the observation target object.

9 Claims, 5 Drawing Sheets

(51) Int. Cl.
    *G02B 21/00*     (2006.01)
    *G02B 21/24*     (2006.01)
    *G02B 21/02*     (2006.01)
    *G02B 21/16*     (2006.01)

(52) U.S. Cl.
    CPC .............. *G02B 21/02* (2013.01); *G02B 21/16* (2013.01); *G02B 21/245* (2013.01)

(58) Field of Classification Search
    CPC .............. G02B 21/245; G02B 21/0088; H04N 5/2352; H04N 5/23245; H04N 5/23293; H04N 5/232
    USPC .......................................................... 359/363
    See application file for complete search history.

(56) References Cited

FOREIGN PATENT DOCUMENTS

| | | |
|---|---|---|
| JP | 2011-123518 | 6/2011 |
| JP | 2012-159854 | 8/2012 |
| WO | 2009/025345 | 2/2009 |

OTHER PUBLICATIONS

International Search Report, Feb. 25, 2014; PCT/JP2013/081259.

\* cited by examiner

FIG. 5

OPTICAL MICROSCOPE, AND AUTOFOCUS DEVICE FOR OPTICAL MICROSCOPE

TECHNICAL FIELD

The present disclosure relates to an optical microscope capable of sending, as an image signal, an optical image of an observation target object that has been captured by an image pickup device, and particularly to an optical microscope including an autofocus device that performs focus adjustment of the objective lens by using autofocus light, and an autofocus device for the optical microscope.

BACKGROUND ART

Optical microscopes and their peripheral devices, which contribute to studies in various fields, have been provided with the function of capturing images of, in particular, an observation target object using an image pickup device in recent years. They send out image data of a captured still image or moving image to external devices such as a computer and a large monitor, and are used for image analysis and phenomenon analysis. Further, the automation of the overall function of the optical microscope is also progressing. For example, in order to adjust the optical microscope while analyzing an image obtained with the optical microscope, the positional adjustment of a stage on which the observation target object is placed, and the operation of switching between a plurality of mounted objective lens having different magnifications, can be performed by a remote operation.

For example, in the field of life science studies, time-lapse observation is often performed in which a high-resolution analysis image is observed over a long period of time in order to analyze the change in the microstructure inside a cell, the pattern of cell differentiation, and the like by using a high-resolution optical microscope. An optical microscope has a very narrow focal length because of its high magnification, and the observation target object will be out of a focal position of the objective lens due to a slight vibration or change in the ambient temperature. In addition, in order to observe the above-described structural change inside a cell, it is often the case that a thermal stimulation is applied externally to a cell to be observed. If this causes a change in the ambient temperature, the focus state to the observation target object is impaired, resulting in the problem that changes in the cell structure cannot be observed accurately.

For this reason, optical microscopes equipped with an autofocus device that can automatically maintain the focus state of the objective lens have been developed. As an autofocus device in the field of optical microscopes, an active autofocus method having a high-speed tracking performance is used. This active autofocus method causes autofocus light emitted via an objective lens to be reflected by a reflection film provided on an interface between a slide glass on which an observation target object is placed and a cover glass mounted on the observation target object or by the interface itself, and from the received reflected light, accurately measures the interval between the objective lens and the observation target object, and maintains this interval constant.

In recent years, there have been proposed optical microscopes capable of performing accurate autofocus even in the case where the interface of the slide glass and a cell nucleus serving as the observation target object are at positions having slightly different intervals with the objective lens, including, for example, a case where only a single nucleus in a cell is observed as performed in the field of the studies of life science. For such an optical microscope, there has been proposed a technique by which focusing is achieved at a position shifted by a predetermined amount from a focus position obtained by the active autofocus method, based on data obtained by a focus operation to the slide glass or the like by the active autofocus method and a focus operation performed by the operator to the observation target object by using an observation optical system (See Patent Document 1).

There has also been proposed a technique by which a focus adjustment lens system is included in the autofocus optical system in the active autofocus method, a focus offset amount is set by performing a focus operation by the operator in a state in which an autofocus operation by the active autofocus method has been performed for the slide glass or the like, and afterward, a focus operation by the active autofocus method is performed by the focus adjustment lens while the focus offset amount is maintained (See Patent Document 2).

CITATION LIST

Patent Documents

Patent Document 1: JP 2011-123518A
Patent Document 2: JP 2007-148161A

DISCLOSURE OF INVENTION

Problem to be Solved by the Invention

With the above-described conventional optical microscope, the interval between the objective lens and the slide glass or the like on which the observation target object is placed can be maintained constant by the active autofocus method having a high-speed tracking performance and accuracy. Therefore it is possible to maintain a favorable state even if the ambient temperature changes. As a result, in particular, an observation based on moving images and a time-lapse observation over a long time can be performed in a suitable manner.

In the conventional active autofocus method, infrared light outside the visible light range is used as the focusing light source of the autofocus optical system. This makes it possible to avoid any practical adverse effect of the infrared light from the focusing light source on the monitoring in the observation optical system and images captured by the image pickup device, for example, in an ordinary optical microscope that uses a tungsten lamp or a halogen lamp as the irradiation light source of the observation optical system and a fluorescence observation microscope in which near-ultraviolet light or blue light is emitted as excitation light.

However, in the case of performing chemiluminescence observation, which is one method of bioimaging, the emission luminance of the observation target object is weak as compared with fluorescence emission observation that uses excitation light emission, and it is therefore necessary to use a detector with a higher sensitivity, in addition to eliminating the causes of light loss such as a filter in the observation optical system as much as possible. Since a faint light is detected in this case, even infrared light, used for the conventional active autofocus method will be disruptive in obtaining an image of the observation target object. On the other hand, the detection of weak emission requires a long time of exposure. However, if a long-time exposure is performed with an optical microscope in a state in which the autofocus device is stopped, a focus shift due to a change over time or the like cannot be avoided, making it impossible to obtain the desired clear captured image.

Therefore, it is an object of the present application to solve the above-described conventional problems, and the present invention provides an optical microscope capable of maintaining an objective lens in a focus state without adversely affecting a captured image even when a substance with a weak emission is used as an observation target object, and an autofocus device that can be used for the optical microscope and enables a favorable chemiluminescence observation.

Means for Solving Problem

In order to solve the above-described problems, an optical microscope disclosed in the present application includes: an observation optical system capable of capturing, with an image pickup device, an optical image of an observation target object that has been obtained with an objective lens, and sending out the optical image as an image signal; and an autofocus device that adjusts a focal position of the objective lens based on autofocus light emitted from a focusing light source so as to focus on the observation target object, wherein the autofocus light is emitted from the focusing light source during a non-capturing period during which the image pickup device is not capturing an image of the observation target object.

An autofocus device for an optical microscope disclosed in the present application is an autofocus device that is used in an optical microscope including an image pickup device capable of sending out, as an image signal, an optical image of an observation target object that has been obtained with an objective lens, and that adjusts a focus position of the objective lens based on reflected light of autofocus light emitted from a focusing light source, wherein the autofocus light is emitted from the focusing light source during a non-capturing period during which the image pickup device is not capturing an image of the observation target object.

Effects of the Invention

With the optical microscope and the autofocus device for an optical microscope disclosed in the present application, autofocus light is emitted during the non-capturing period during which the image pickup device is not capturing an image of the observation target object, and it is therefore possible to avoid possible effects of the autofocus light on a captured image even when using a high-sensitivity detector. Accordingly, an observation image of an observation target object in a correctly focused state can be obtained even when the emission luminance of the observation target object is weak.

DESCRIPTION OF THE INVENTION

In a conventional active autofocus method, focus position correction is constantly performed by continuously detecting positions by constant irradiation with autofocus light. However, it is not necessary to constantly perform an autofocus operation, and the focus state to the observation target object can also be sufficiently maintained by performing an autofocus operation discontinuously. An optical microscope disclosed in the present application includes: an observation optical system capable of capturing, with an image pickup device, an optical image of an observation target object that has been obtained with an objective lens, and sending out the optical image as an image signal; and an autofocus device that adjusts a focal position of the objective lens based on autofocus light emitted from a focusing light source so as to focus on the observation target object, wherein the autofocus light is emitted from the focusing light source during a non-capturing period during which the image pickup device is not capturing an image of the observation target object.

By doing so, an image of the observation target object in a state in which autofocus light is not emitted is captured in the image pickup device. Accordingly, it is possible to effectively avoid any adverse effect of the autofocus light on a captured image.

In the optical microscope disclosed in the present application, it is preferable that a capturing period during which an image of the observation target object is captured and the non-capturing period are repeated in the image pickup device, and the image pickup device continuously captures an image of the observation target object during the capturing period, while the autofocus device performs an autofocus operation during the non-capturing period. This makes it possible to avoid the effect of a focal drift during a long period of image capturing, thus obtaining continuous captured images of the observation target object in a correctly focused state.

Preferably, the autofocus device selects a predetermined non-capturing period from among a plurality of the non-capturing periods, and performs the autofocus operation only in the selected non-capturing period. Doing so makes it possible to discontinuously perform an autofocus operation at necessary intervals according to, for example, the degree of focus variations, thus effectively avoiding undesired effects that may be exerted by the autofocus light on a sample to be observed or on a captured image.

In the optical microscope disclosed in the present application, it is preferable that the image pickup device includes a CCD image sensor as an image pickup element, and the non-capturing period is a readout time during which the image pickup element transfers captured image data. This makes it possible to obtain image data of the observation target object without any effect of the autofocus light by using a commonly used CCD image sensor as the image pickup element.

Preferably, the autofocus light emitted by the focusing light source is infrared light outside the visible range.

Furthermore, it is preferable that the optical microscope disclosed in the present application is used for chemiluminescence observation in which a luminescent material that emits light by a chemical reaction is observed as the observation target object. Even when the observation target object has a weak emission luminance and a high-sensitive detector is used, it is possible to obtain an image of the observation target object that is free of the influence from the autofocus light.

It is preferable to include a focus adjustment lens that performs autofocus on an observation target portion located in a position spaced away by a predetermined distance from an interface of a glass substrate on which the observation target object is placed, by using the autofocus light reflected at the interface of the glass substrate. Doing so makes it possible to maintain a favorable focus state even when an observation target portion, such as the cell nucleus of a cell disposed in a nutrient solution, of an observation target object is positioned away from a reference plane of autofocus.

Furthermore, the optical microscope disclosed in the present application may be an inverted microscope in which the objective lens is located below the observation target object.

An autofocus device for an optical microscope disclosed in the present application is an autofocus device that is used in an optical microscope including an image pickup device capable of sending out, as an image signal, an optical image of an observation target object that has been obtained with an objective lens, and that adjusts a focus position of the objective lens based on reflected light of autofocus light emitted from a focusing light source, wherein the autofocus light is emitted from the focusing light source during a non-capturing period during which the image pickup device is not capturing an image of the observation target object.

By doing so, an image of an observation target object in a state in which autofocus light is not emitted can be captured by the image pickup device, making it possible to obtain an autofocus device that effectively avoids an adverse effect on a captured image.

Embodiment

Hereinafter, an embodiment of an optical microscope and an autofocus device for an optical microscope according to the present application will be described with reference to the drawings.

Figure 1:
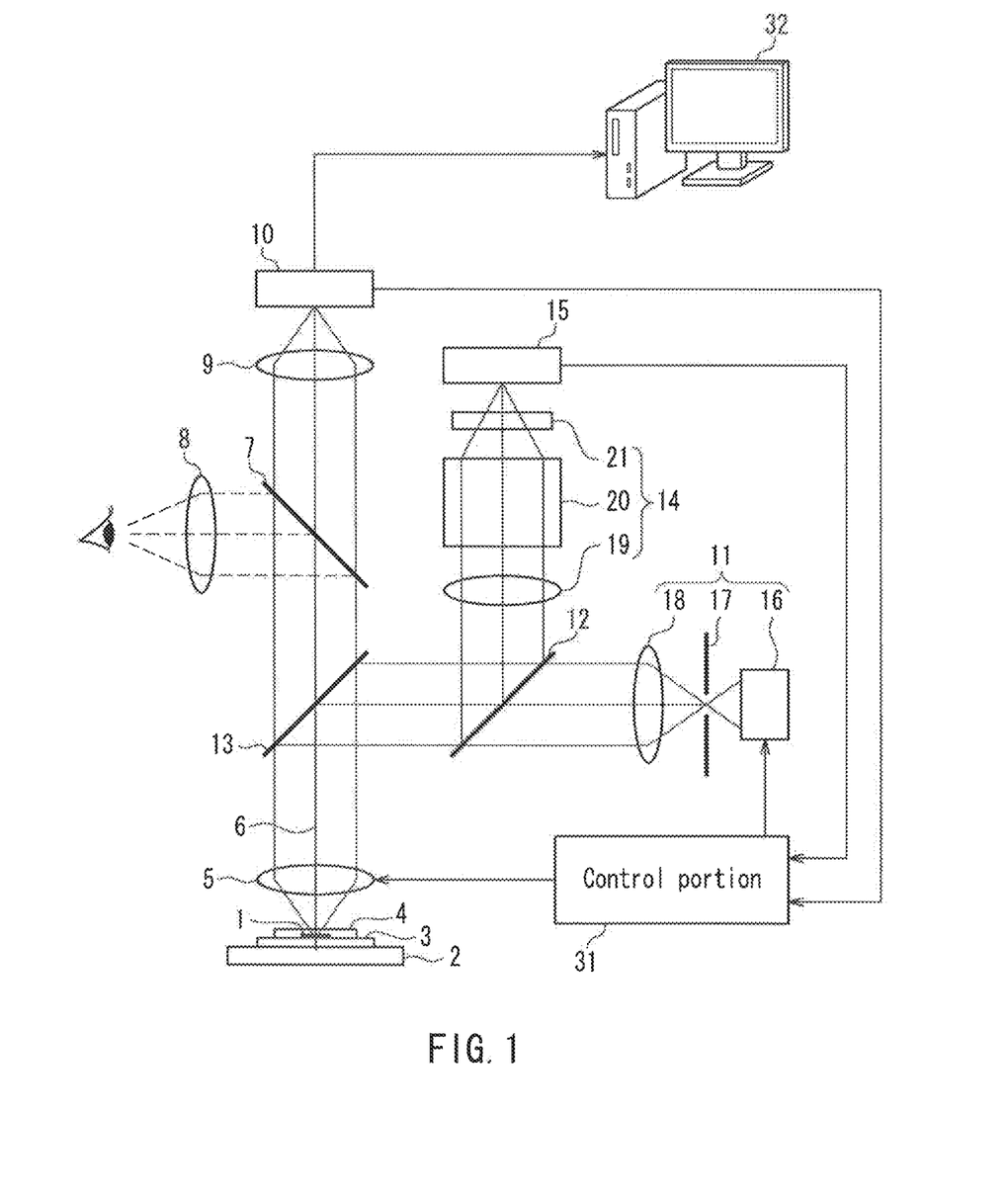
FIG. 1 is a block configuration diagram showing a schematic configuration of an optical microscope of a first exemplary configuration according to the present embodiment.

FIG. 1 is a block diagram for illustrating a schematic configuration of an upright optical microscope in which an objective lens is disposed above an observation target object, as a first exemplary configuration of the optical microscope according to the present embodiment.

In the optical microscope of the first exemplary configuration shown in FIG. 1, an observation target object 1 is placed on a slide glass 3 serving as a glass substrate placed on a stage 2, and is disposed in a state in which it is sandwiched between the slide glass 3 and a cover glass 4 that covers the observation target object 1.

The stage 2 is movable in the X-Y direction in a plane perpendicular to an optical axis 6 of an objective lens 5 located above the observation target object 1. Note that the stage 2 may also be movable in the optical axis direction of the objective lens 5 (the Z direction). In addition, the movement of the stage 2 in the X direction and the Y direction, and in some cases, the Z direction, may be electrically powered using a motor. In that case, a stage control portion that controls the movement of the stage 2 may be provided, and the movement of the stage can be controlled from a control portion 31 that performs overall control of the optical microscope, in conjunction with the operation of other members, for example, the operation of a focal position of the objective lens 5.

The optical microscope of the present exemplary configuration includes an observation optical system composed of the objective lens 5, an optical path switching mirror 7, an eyepiece 8, a camera lens 9, a camera 10 serving as an image pickup device, and an autofocus optical system composed of an autofocus light source portion 11, a half mirror 12, a dichroic mirror 13, an autofocus light-collecting portion 14, and an autofocus light-receiving portion 15.

The observation optical system is configured such that an optical image of the observation target object 1 that has been obtained with the objective lens 5 can be observed as a still image or a moving image by visual inspection or by the use of the camera 10 serving as the image pickup device. Although the optical microscope of the present exemplary configuration is configured to switch between a mode in which the optical path switching mirror 7 is disposed in the observation optical system and visual inspection is performed via the eyepiece 8 and a mode in which image data is obtained with the camera 10 via the camera lens 9, it is also possible to adopt a configuration in which the visual inspection and the acquisition of image data can be performed simultaneously.

The camera 10 is an image pickup device including a CCD (Charge Coupled Device) image sensor as an image pickup element. As will be described later, the camera 10 of the optical microscope according to the present exemplary configuration is configured to alternately repeat two operation periods, namely, a capturing period during which a large number of light-receiving elements each receive, as an optical signal, an optical image of the observation target object 1 that has been obtained through the camera lens 9 by the objective lens 5, and a readout time during which the electric charge obtained by each of the light-receiving elements is sent out as an electric signal, and the camera 10 is capable of converting an optical signal into an electric signal and sending out the signal. In addition, the camera 10 transmits the operation timing between the readout time and the capturing period of the operation periods to the control portion 31 of the optical microscope.

The captured image of the observation target object 1 obtained with the camera 10 is sent out as an electric signal to a monitor 32 that is attached to the optical microscope or disposed separately as an external device, and an enlarged image of the observation target object 1 can be observed in real time on the monitor 32. Note that the monitor 32 may serve as a monitor portion of the computer as shown in FIG. 1 and display an image obtained after performing image processing on the obtained image signal on a computer, or may be configured as a display portion physically integrated with and attached to the optical microscope, and having only the function of directly displaying an image of the observation target object 1.

The autofocus light source portion 11 of the autofocus optical system is made up of a focusing light source 16 composed of, for example, an infrared LED that emits near-infrared light, a slit 17, a collimating lens 18, a pupil-limiting portion (not shown), and the like, and emits autofocus light.

The autofocus light emitted from the autofocus light source portion 11 enters the objective lens 5 via the half mirror 12 and the dichroic mirror 13 that reflects red light, and is collected at the interface portion between the slide glass 2 and the cover glass 4 that are located at the same planar position as the observation target object 1. The autofocus light that has been reflected at the interface portion of the slide glass 2 or the cover glass 4, or at a reflection film, which may be provided so as to perform more accurate autofocus, passes through the dichroic mirror 13 and the half mirror 12, and enters the autofocus light-collecting portion 14.

The autofocus light that has entered the autofocus light-collecting portion 14 is collected at the autofocus objective lens 19, temporarily imaged as a slit image by the image-forming portion 20 including a slit portion and a relay lens, passes through the cylindrical lens 21, and is imaged again in the autofocus light-receiving portion 15.

The autofocus light-receiving portion 15 is configured to convert an optical signal into an electric signal by using a light-receiving element such as a CCD image sensor as with the camera portion 10, and it detects the imaged slit image of the autofocus light as an electric signal, and transmits the focus state to the control portion 31.

The control portion 31 determines the focus state at the objective lens 5 based on the state of the slit image of the autofocus light transmitted from the autofocus light-receiving portion 15, and performs control to constantly maintain the focus state by correcting the focal position of the objective lens 5 if there has been a shift in focus. As the method for correcting the focal position of the objective lens 5, it is possible to use various optically utilizable methods, including, for example, a method of moving the placement position of the objective lens 5 itself along the optical axis, and a method of varying the intervals between lenses if the objective lens 5 is configured as a group of a plurality of lens.

Thus, in the optical microscope shown in FIG. 1, the autofocus optical system, the control portion 31, the objective lens 5, and the adjustment mechanism of the focal position thereof constitute the autofocus device for the optical microscope.

Note that the components of the observation optical system of an ordinary optical microscope can be directly applied to the observation optical system of the optical microscope in the present exemplary configuration described above. Therefore, although not shown in FIG. 1, an irradiation light source can be disposed so as to irradiate the observation target object 1, from below the slide glass 3 in the case of the transmission type, or from above the slide glass 3 via the objective lens 5 through a part of the observation optical system in the case of the epi-illumination type. Although the objective lens 5 is illustrated as a single lens in FIG. 1, a plurality of objective lenses having different magnifications can be disposed so as to be switchable using a revolver. By placing a motor for rotating the revolver, the objective lenses can be made electrically switchable via a signal from the control portion 31, making it possible to vary the observation magnifications.

As with the observation optical system, the autofocus optical system of the optical microscope according to the present exemplary configuration described above can use the components of an autofocus optical system based on an ordinary activefocus method. Also, a commonly used control can be used for the control content for performing control to determine the focus state based on the image data obtained with the autofocus light-receiving portion 14, and to correct the focus position of the objective lens 5 so as to maintain the focus state. Therefore, the autofocus optical system of the optical microscope according to the present embodiment is not limited to the exemplary configuration shown and described above.

Figure 2:
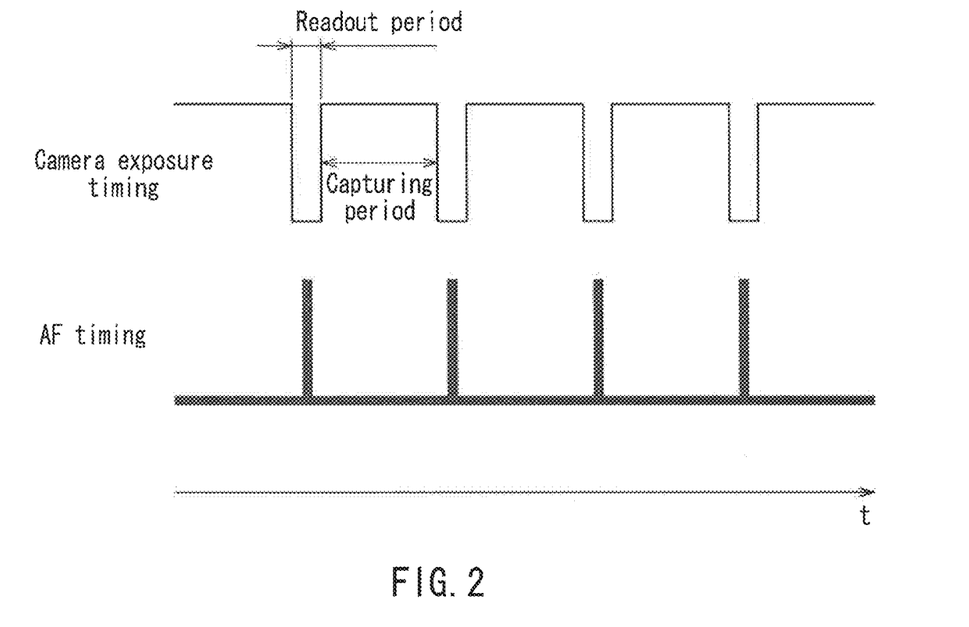
FIG. 2 is a diagram showing a relationship between the exposure timing of a camera and the irradiation timing of autofocus light in the optical microscope according to the present embodiment.

FIG. 2 shows a relationship between the exposure timing in each image pickup element in the camera 10 of the observation optical system and the irradiation timing of autofocus light in the focus light source 16 of the autofocus optical system in the optical microscope according to the present embodiment.

As shown in FIG. 2, in the optical microscope of the present embodiment, autofocus light is emitted during the readout time of electric signals in the CCD image sensor used in the camera 10.

In general, when the CCD image sensor is used as an image pickup element, the electric charges stored in each of the light-receiving elements during the capturing period are read to the outside via a transfer electrode during the readout time at a predetermined timing. Since the electric charges in all the light-receiving elements are sequentially transferred and read out during the readout time, the light-receiving elements do not store an electric charge during the readout time, and any optical image obtained with the objective lens 5 will not be converted into an electric signal during this period. Accordingly, even if autofocus light is emitted to the observation target object 1 during the readout time, no adverse effect will be exerted on a captured image obtained with the camera 10. By ending the irradiation timing of autofocus light within the readout time of the camera 10 in the above-described focus operation based on a focused image obtained with the autofocus optical system, the image data for the capturing period during which autofocus light is not emitted can be obtained with the camera 10.

Note that some cameras may allow the length of the readout time to be adjusted by the user, and in that case, it is possible to achieve a more favorable image observation of the observation target object by setting the shortest possible readout time within the range that the camera does not receive autofocus light, taking into consideration the irradiation time of autofocus light and the time required for the autofocus operation in the autofocus device included in the optical microscope.

In the optical microscope of the present embodiment, the irradiation time of autofocus light is set to 100 µs as an example. Further, since the time required for the autofocus operation can be made very short by using means having a high-speed tracking performance such as a piezoelectric element or a stepping motor as the means for adjusting the focal position of the objective lens, the autofocus operation can be completed during the non-capturing period of the camera 10 in the case of the optical microscope of the present embodiment. Note that the irradiation timing of the autofocus light may be set to any timing during the readout time as long as the irradiation ends within the readout time.

Note that in the case of capturing a moving image of the observation target object 1, captured images during the capturing period are continuously obtained while the capturing period and the non-capturing period are repeated in the camera 10 serving as the image pickup device. In this case as well, captured images in a correct focus state can be constantly obtained by performing the autofocus operation during the non-capturing period. In particular, a shift in focus, which is called "focal drift", due to a change in the environment tends to occur in the case of a long-time image capturing. However, with the optical microscope of the present disclosure, it is possible to obtain a favorable moving image by tracking this focal drift.

Although a plurality of capturing periods and non-capturing periods alternately appear in this case, the focus operation can be performed in all of the plurality of non-capturing periods, and the focus operation can be performed in any selected non-capturing period among the plurality of non-capturing periods. For example, when it is known in advance that the amount of focal drift during a long image capturing time is small, the frequency with which autofocus light is emitted to the observation target object 1 is reduced by thinning out the timings of performing the autofocus operation so as to be limited to the selected non-capturing periods. As a result, even if there is any stimulus to the observation target object 1 applied by the autofocus light or any undesired entry of the autofocus light into a captured image, these can be effectively reduced. Note that the timing of performing the autofocus operation may be set at regular intervals by setting the timing for every predetermined number of non-capturing periods, or may be set at irregular intervals by randomly selecting the non-capturing periods in which the autofocus operation is performed.

As described above, with the optical microscope of the present embodiment, the autofocus light is emitted during the non-capturing period in the image pickup device, and thereby, image data of the observation target object that is free from the influence of the autofocus light can be obtained even in the case where image capturing with a highly sensitive detector or long-time image capturing is required because of a weak emission luminance of the observation target object, as in chemiluminescence observation, for example.

Figure 3:
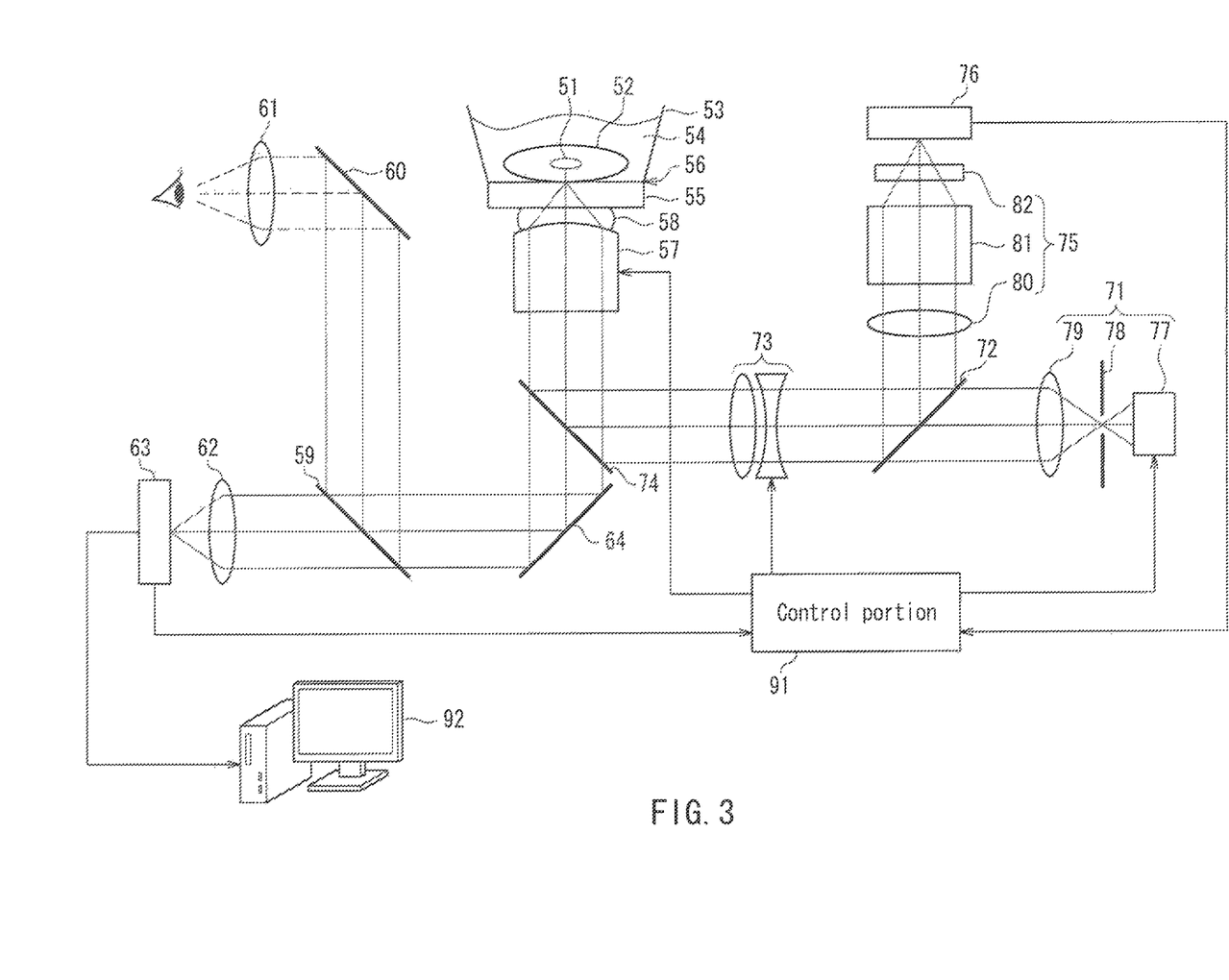
FIG. 3 is a block configuration diagram showing a schematic configuration of an optical microscope of a second exemplary configuration according to the present embodiment.

FIG. 3 is a block diagram for illustrating a schematic configuration in an inverted configuration in which the objective lens is disposed above the observation target object, as a second exemplary configuration of the optical microscope according to the present embodiment.

In the optical microscope of the second exemplary configuration according to the present embodiment shown in FIG. 3, an observation target object 51 is, for example, the nucleus of a cell serving as a sample 52, and the cell serving as the sample 52 is disposed in a nutrient solution 54 in a petri dish 53. The petri dish 53 is placed on a cover glass 55 as a glass substrate also serving as a platform, and an interface 56 is formed between the petri dish 53 and the cover glass 55.

The cover glass 55 is disposed above the objective lens device 57 via a predetermined optical coupling member 58. Note that the optical axis of an objective lens (not shown) in the objective lens device 57 may be movable relative to the observation target object 51.

The optical microscope of the second exemplary configuration includes an observation optical system composed of the objective lens in the objective lens device 57, a first mirror 64, a half mirror 59, a second mirror 60, an eyepiece 61, a camera lens 62, and a camera 63 serving as an image pickup device, and an autofocus optical system composed of an autofocus light source portion 71, a half mirror 72, a focus optical path adjustment portion 73, a dichroic mirror 74, an autofocus light-collecting portion 75, and an autofocus light-receiving portion 76.

The observation optical system is configured such that an optical image of the observation target object 51 that has been obtained with the objective lens in the objective lens device 57 can be observed as a still image or a moving image by visual inspection or by the use of the camera 63. With the optical microscope of the present exemplary configuration, the visual inspection via the eyepiece 61 with the half mirror 59 disposed in the observation optical system and the acquisition of image data by the camera 63 via the camera lens 62 can be performed simultaneously.

The camera 63 is an image pickup device including a CCD image sensor as an image pickup element. As shown in FIG. 2, the camera 63 of the optical microscope of the present exemplary configuration also has, as exposure timings, two operation periods, namely, a capturing period during which a large number of light-receiving elements each receive an optical image of the observation target object 51, and a readout time during which an electric signal such as an electric charge obtained with each of the image pickup elements is sent to the outside. In addition, the camera 63 transmits the operation timing between the capturing period and the capturing period during the exposure timing to the control portion 91 of the optical microscope.

The captured image of the observation target object 51 obtained with the camera 63 is sent as an electric signal, for example, to a computer 92, which is an external device, and is displayed on the computer monitor after being subjected to the desired image processing. Note that as with the optical microscope of the first exemplary configuration described with reference to FIG. 1, the data of the captured image obtained with the camera portion 63 can be displayed on the monitor portion attached to the optical microscope.

As with the first exemplary configuration shown in FIG. 1, the autofocus light source portion 71 of the autofocus optical system is made up of, for example, a focusing light source 77 composed of an infrared LED that emits near-infrared light, a slit 78, a collimating lens 79, a pupil-limiting portion (not shown), and the like, and autofocus light is emitted during the readout time, which is a non-capturing period, of the camera portion 63.

The autofocus light that has been emitted from the autofocus light source portion 71 enters the objective lens of the objective lens device 57 via the half mirror 72, the focus optical path adjustment portion 73, and the dichroic mirror 74 that reflects red light, and is collected at the interface 56 between the petri dish 53 and the cover glass 54. The autofocus light that has been reflected at the interface 56 between the petri dish 53 and the cover glass 54 passes through the dichroic mirror 74, the focus optical path adjustment portion 73, and the half mirror 72, and enters the autofocus light-collecting portion 75.

The autofocus light that has entered the autofocus light-collecting portion 75 is collected at the autofocus objective lens 80, temporarily imaged as a slit image by the image-forming portion 81 including a slit portion and a relay lens, passes through the cylindrical lens 82, and is imaged again in the autofocus light-receiving portion 76.

The autofocus light-receiving portion 76 is configured to convert an optical signal into an electric signal by a light-receiving element such as a CCD image sensor, and it detects the imaged slit image of the autofocus light as an electric signal, and transmits the focus state to the control portion 91.

The control portion 91 determines the focus state at the objective lens device 57 based on the state of the slit image of the autofocus light transmitted from the autofocus light-receiving portion 76, and performs control to maintain the focus state by correcting the focal position of the objective lens by adjusting the objective lens device if there has been a shift in focus. Note that the optical microscope of the second exemplary configuration includes the focus adjustment lens 73 in the focus optical system as with the autofocus device disclosed in Patent Document 2, and is configured such that a predetermined focus offset amount is set for the autofocus light reflected at the interface 56 between the petri dish 53 and the cover glass 54, thereby making it possible to maintain the focus state to the observation target object 51, which is located at a predetermined interval from the interface 56, which is an actual reflection plane of the autofocus light.

In the optical microscope of the second exemplary configuration shown in FIG. 3 as well, the control portion 91 controls the readout timing of image signals from the image pickup elements in the camera 63 of the observation optical system and the irradiation timing of the autofocus light in the focus light source 77 of the autofocus optical system such that the autofocus light is emitted during the readout time of electric signals from the light-receiving elements of the camera portion 63 as shown in FIG. 2. Accordingly, in the optical microscope of the second exemplary configuration shown in FIG. 3 as well, the image data of the observation target object 51 for only a period during which the autofocus light is not applied can be obtained with the camera portion 63 by ending the irradiation with the autofocus light within the readout time of the image pickup element of the camera portion 63 in a focus operation based on a focused image obtained with the autofocus optical system.

Note that in the inverted second exemplary configuration shown in FIG. 3, conventionally known configurations can be used as the observation optical system and the autofocus optical system, as with the first exemplary configuration shown in FIG. 1. Therefore, the configuration shown in FIG. 3 is merely an exemplary configuration. In the optical microscope of the second exemplary configuration shown in FIG. 3 as well, an irradiation light source (not shown) can be disposed so as to irradiate the observation target object 51 via a part of the observation optical system. Further, in the objective lens device 57 shown in FIG. 3, a plurality of objective lenses having different magnifications can be disposed so as to be automatically switchable. Conversely, by including the focus adjustment lens used in the second exemplary configuration described with reference to FIG. 3 in the autofocus optical system, a predetermined focus offset amount can also be set for the autofocus light in the optical microscope of the first exemplary configuration described with reference to FIG. 1.

As described thus far, with the optical microscope of the present embodiment, the irradiation timing of the autofocus light, which is emitted for performing autofocus, from the focus light source is controlled such that the autofocus light is emitted during the non-capturing period during which image data is not captured in the image pickup device that acquires image data of the observation target object. By doing so, it is possible to reliably avoid the effect of the autofocus light from exerted on a captured image of the observation target object that is captured by the image pickup device.

Figure 4:
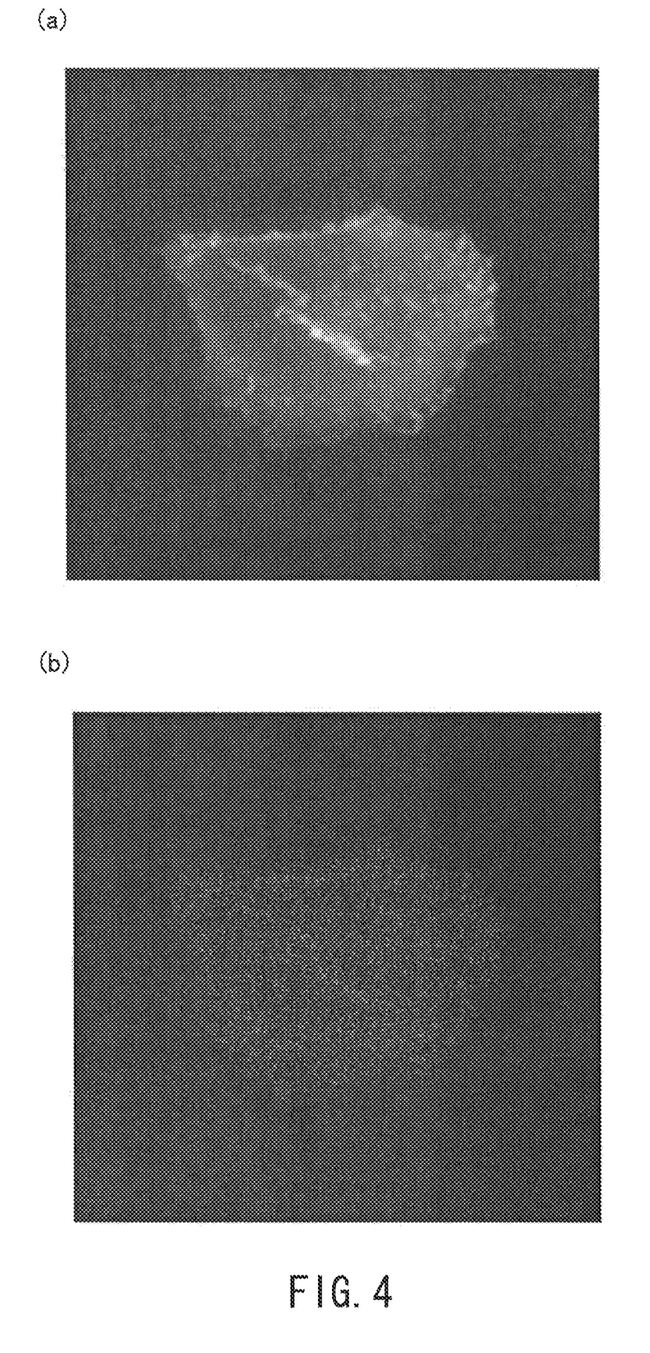
FIG. 4 show exemplary images, obtained with a conventional optical microscope, of an observation target by fluorescence observation and chemiluminescence observation.

FIG. 4 show a comparison between a fluorescence image of a HeLa cell that expresses a fluorescent protein in a cell membrane (FIG. 4(*a*)) and a chemiluminescence image of the same cell that expresses a chemiluminescent protein in a cell membrane (FIG. 4 (*b*)), each obtained with a conventional optical microscope. Note that an objective lens with a magnification of 60× is used. As shown in FIG. 4, the cell configuration is hardly observed by the chemiluminescence observation because of a small luminance of the observation target object.

Figure 5:
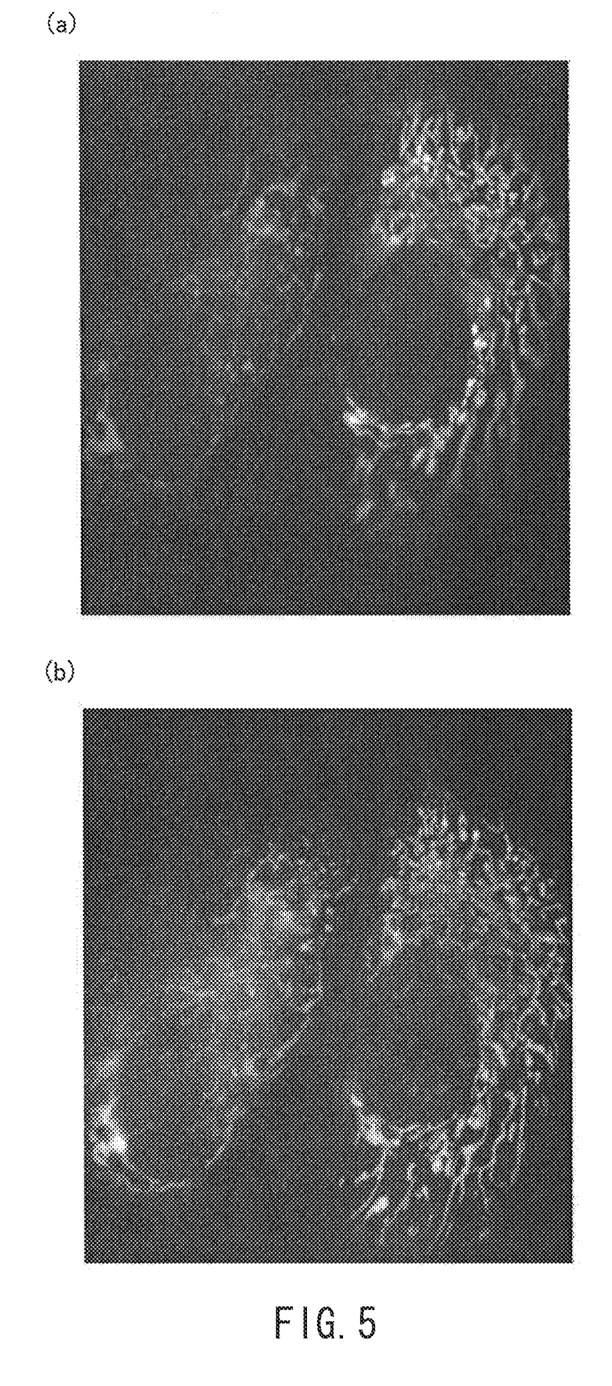
FIG. 5 show exemplary images, obtained with an optical microscope according to the present embodiment, of an observation target of fluorescence observation and chemiluminescence observation.

In contrast, FIG. 5 show a fluorescence observation image (FIG. 5(*a*)) and a chemiluminescence observation image (FIG. 5 (*b*)) of mitochondria, obtained with the luminescent protein Nano-lantern whose luminance has been increased by high-efficiency FRET from that of a chemiluminescent protein to that of a high-luminance fluorescent protein. Note that an objective lens with a magnification of 60× is used.

As shown in FIG. 5, a clear observation image equivalent to that obtained by fluorescence observation was also obtained by chemiluminescence observation. Accordingly, it is possible to perform a more favorable cell observation as compared with fluorescence observation, which may cause damage to a cell to be observed because it requires irradiation with ultraviolet light, which is excitation light. Nano-lantern is a high-luminance chemiluminescent probe, and thus enables video-rate observation. Therefore, combining this probe with the optical microscope of the present embodiment makes it possible to perform a high-speed cell observation without concern for a focus shift due to a temperature change or stage variations.

Note that the provision of a configuration that emits excitation light for performing fluorescence observation makes it possible to use the optical microscope described in the present embodiment for fluorescence observation. Since the autofocus irradiation light described in the embodiment above has an irradiation energy sufficiently smaller than an irradiation energy of 0.1 to 1 W/cm$^2$, which is required to stimulate a cell to be observed, there is no possibility that a cell to be observed causes any undesired reaction by being irradiated with the autofocus light.

Furthermore, with the optical microscope according to the present disclosure, the timing of emitting the autofocus light is different from the acquisition timing of image data. Accordingly, the autofocus light is not limited to light outside the visible range, and it is also possible to use visible light. Therefore, it is possible to use, as the autofocus light, light of the desired wavelength that allows autofocus to be performed accurately and in a short time, making it possible to improve the precision of autofocus. In addition, when the amount of light emitted by the observation target object is small as in the case of chemiluminescence observation, it is conceivable that a dichroic mirror having a higher transmittance is used as the dichroic mirror disposed in the observation optical system for emitting the autofocus light, thereby detecting the emission of the observation target object with as little loss of light as possible.

Moreover, for the optical microscope of the present embodiment described above, an example is disclosed in which a CCD image sensor is used as the image pickup device. However, it is possible to use an image pickup device including a semiconductor image pickup element such as a CMOS image sensor. In the case of a CMOS image sensor, the readout time of reading out the electric charges stored in the light-receiving elements at a time is not provided as in the case of the CCD image sensor, and readout is performed in the line sequential method. However, the so-called blank period corresponds to the non-capturing period, and therefore, autofocus light can be applied during the non-capturing period. Furthermore, the image pickup device used for the optical microscope of the present embodiment is not limited to those including these semiconductor image pickup elements. For example, it is possible to use an image pickup device including a vacuum tube-type image pickup element such as a photomultiplier and any of various other types of image pickup elements. In this case, depending on the image pickup device, it may not be necessary to provide the non-capturing period such as the CCD readout time in the operation periods. In that case, a non-capturing period may be forcibly formed in the operation periods, and autofocus light may be emitted in timing with that non-capturing period.

INDUSTRIAL APPLICABILITY

The optical microscope and the autofocus device for an optical microscope disclosed in the present application are expected to be used in a wide variety of fields as an optical microscope capable of performing imaging by various methods, including, for example, chemiluminescence observation, and an autofocus device for the optical microscope.

The invention claimed is:

1. An optical microscope comprising:
    an observation optical system capable of capturing, with an image pickup device, an optical image of an observation target object that has been obtained with an objective lens, and sending out the optical image as an image signal; and
    an autofocus device that adjusts a focal position of the objective lens based on autofocus light emitted from a focusing light source so as to focus on the observation target object,
    wherein a capturing period during which an image of the observation target object is captured and a non-capturing period during which an image of the observation target object is not captured are repeated in the image pickup device,
    the image pickup device captures a moving image of the observation target object by continuously obtaining captured images during the capturing period, and
    the autofocus light is emitted from the focusing light source during the non-capturing period.
2. The optical microscope according to claim 1,
    wherein the autofocus device selects a predetermined non-capturing period from among a plurality of the non-capturing periods, and performs the autofocus operation only in the selected non-capturing period.
3. The optical microscope according to claim 1,
    wherein the image pickup device includes a CCD image sensor as an image pickup element, and the non-capturing period is a readout time during which the image pickup element transfers captured image data.
4. The optical microscope according to claim 1,
    wherein the autofocus light emitted by the focusing light source is infrared light outside the visible range.
5. The optical microscope according to claim 1,
    wherein the optical microscope is used for chemiluminescence observation in which a luminescent material that emits light by a chemical reaction is observed as the observation target object.
6. The optical microscope according to claim 1, comprising
    a focus adjustment lens that performs autofocus on an observation target portion located in a position spaced away by a predetermined distance from an interface of a glass substrate on which the observation target object is placed, by using the autofocus light reflected at the interface of the glass substrate.
7. The optical microscope according to claim 1,
    wherein the optical microscope is an inverted microscope in which the objective lens is located below the observation target object.
8. An autofocus device for an optical microscope that is used in an optical microscope including an image pickup device capable of sending out, as an image signal, an optical image of an observation target object that has been obtained with an objective lens, and that adjusts a focus position of the objective lens based on reflected light of autofocus light emitted from a focusing light source,
    wherein a capturing period during which an image of the observation target object is captured and a non-capturing period during which an image of the observation target object is not captured are repeated in the image pickup device,
    the image pickup device captures a moving image of the observation target object by continuously obtaining captured images during the capturing period, and
    the autofocus light is emitted from the focusing light source during the non-capturing period.
9. The optical microscope according to claim 1, wherein the image pickup device includes a CMOS image sensor as an image pickup element, and the non-capturing period is a period during which the image pickup element does not acquire captured image data.

* * * * *